United States Patent Office 3,332,620
Patented July 25, 1967

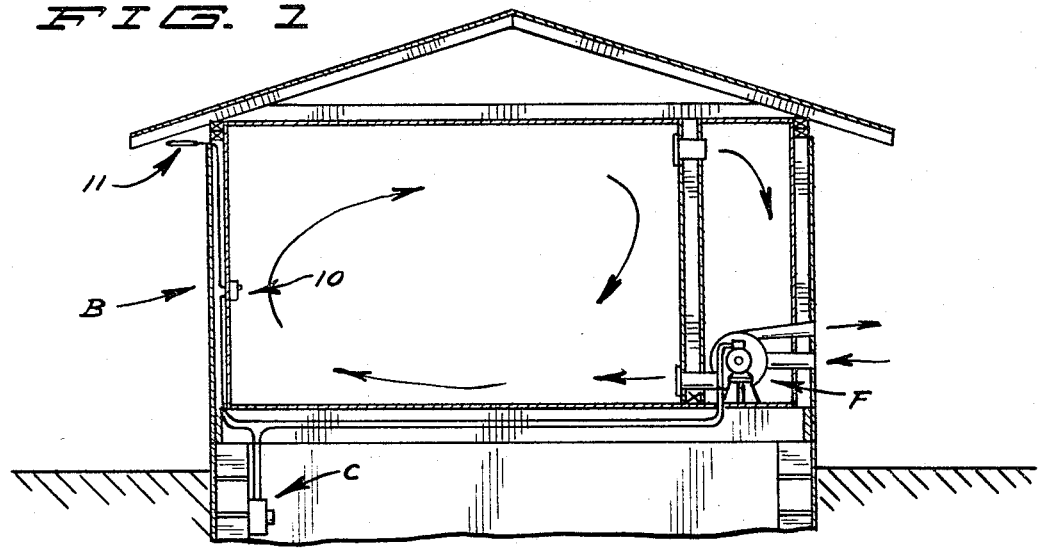
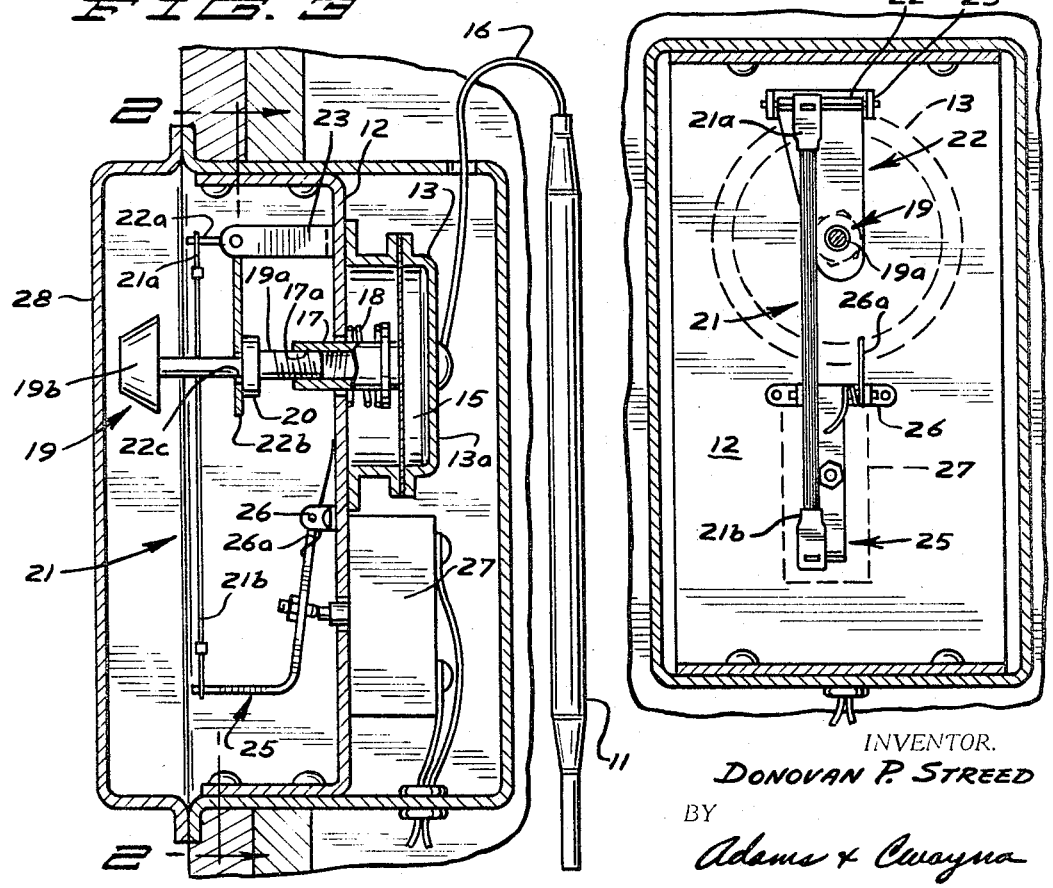

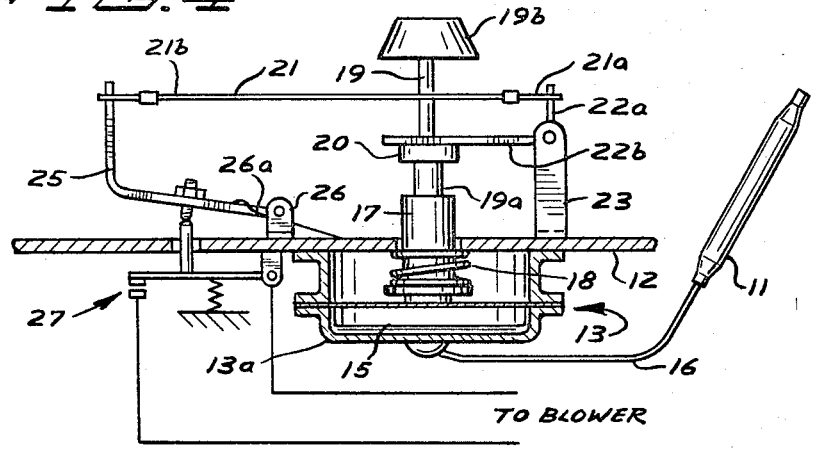
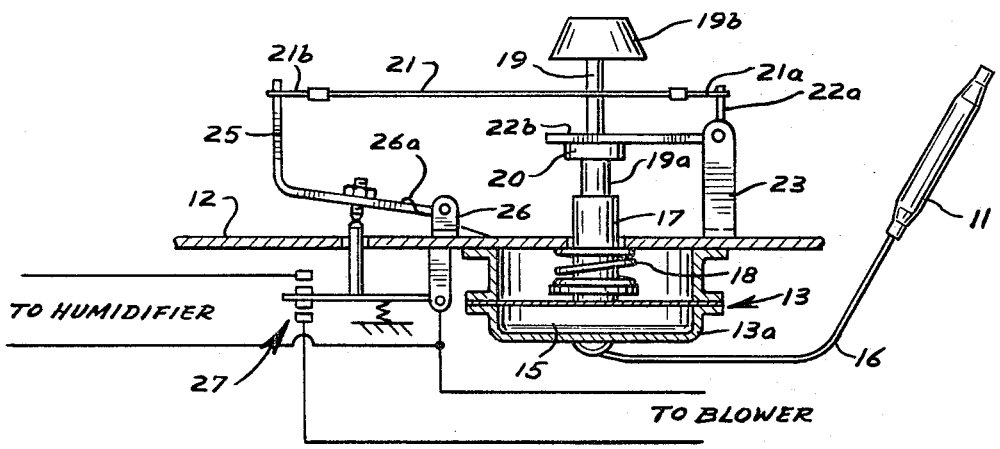

3,332,620
RELATIVE HUMIDITY CONTROL FOR BUILDINGS
Donovan P. Streed, Rte. 2, Shakopee, Minn. 55379
Filed July 8, 1965, Ser. No. 470,443
9 Claims. (Cl. 236—44)

This invention relates generally to humidity control devices and more particularly to a humidity control device which is responsive to temperature outside of a building such that the relative humidity within the building may be controlled in a manner to prevent condensation formation on the exterior surfaces of the building.

It has long been a problem in the art to provide a means for controlling the relative humidity in homes and the like such that the inhabitant is provided with a comfortable humidity bearing atmosphere and further that the humidity is controlled in relation to the temperature without the building such that the water vapor within the building will not condensate on the outside surfaces of the building and cause deterioration of the building materials.

Inhabitants of a home require and would like to maintain a substantially constant inside temperature for the home. This temperature has been found to be in the area of 68–75 degrees. Likewise, at this desired temperature there is a relative humidity level at which the inhabitant will be most comfortable. This has been found to be in the area of 30–50% such that the air within the building will maintain enough moisture to satisfy the inhabitant's needs but will not contain so much moisture as to make the apparent temperature seem higher.

Relative humidity is a temperature factor which is not totally understood by most people. As defined, relative humidity is the percentage of water vapor in the air as compared with the percentage of water vapor that the air may hold at a particular temperature. This is to say that a relative humidity of 35% means that the air is carrying 35% of its possible moisture content at any specific temperature. If this relative humidity were raised to 100%, the water vapor in the air at this specific temperature would condense or would start to condense.

The effect that relative humidity has on people is that high relative humidities tend to raise the apparent temperature which is due to the fact that the person is not perspiring at a desirable rate. Rather due to the substantial moisture or water vapor in the air the perspiration from the persons body will tend to be more slowly evaporated and therefore the heat will not pass from his body as rapidly as if the relative humidity were much lower. On the other hand at very low relative humidities, the individual may develop breathing problems or likewise his skin may tend to dry out and crack.

As far as building materials are concerned, a low relative humidity tends to dry them of their ideal moisture content and causes them to shrink. On the other hand, a high relative humidity causes the material to take on the water vapor and swell and may eventually result in a strength deterioration.

The situation which is the object of this invention is to provide a relative humidity control system which will effectively maintain the humidity at a desirable inside level at a constant temperature while likewise providing a reduction in relative humidity to prevent condensation of water vapor on the exterior walls of the building should the external temperature be lowered.

For example, should a desirable situation be an internal temperature of 70 degrees with a relative humidity of 35% at an external temperature of 35 degrees and should the external temperature drop to 20 degrees this relative humidity of 35% may in effect be at a point of condensing. The control of this invention will automatically cause the internal relative humidity to be lowered to a point where such condensation will not occur.

To accomplish the object of this invention the inventor provides an outside temperature sensing unit which automatically adjusts an internal relative humidity sensing device. Most homes and buildings are presently adapted for moving the internal air and the principle of this invention includes such a device which will when the relative humidity is at a point of possible condensation with respect to outside temperature bring in relatively cold dry air from the outside to replace the moisture laden air inside of the building to thus adjust the relative humidity interiorly of the building to a point which will be within the respective comfort range while not permitting the water vapor to condense on the exterior surfaces of the building.

From a practical standpoint the relative humidity figures which are ideal for an inhabitant's comfort at 70 degrees are in an area from 30–50% relative humidity. However, should the outside temperature be substantially low, which is to say below 30 degrees, the 50% relative humidity interiorly would be at a point to cause condensation and moisture build-up in the walls and materials of the building so that automatic control feature would sense the exterior temperature and automatically remove the moisture laden air from the building and replace this with air having a lower relative humidity to adjust the interior relative humidity to a point which still being in the comfort zone will be substantially less than that at which the moisture build-up would affect the materials. Applicant's device provides an automatic setting for the home or building and eliminates manual changes in the relative humidity settings. These changes are difficult to make unless a person thoroughly understands relative humidity and its associated moisture problems and this change must be a constantly moistured change which is difficult on a manual basis.

The structure described herein when slightly modified, may be useable to likewise add humidity to a building or home such that should the internal temperature be substantially constant with a low external temperature and if the home or building has a large volume of air change due to leakages of the windows and construction defaults, a humidity adding device may be controlled by this unit such that humidity will be added to a point to retain the comfort level within the home but not to pass the point at which the water vapor would begin to condense.

It is, therefore, an object of applicant's invention to provide a humidity control device for controlling the internal relative humidity of buildings and the like which device employs an outside temperature sensing device such that the relative humidity may be controlled in response to the outside temperature to prevent condensation of the water vapor on the exterior building surfaces.

It is a further object of applicant's invention to provide a relative humidity control device which will be effective in controlling either through deletion or addition of moisture vapor to the internal air the relative humidity within a building, home or the like.

It is a further object of applicant's invention to provide an automatically adjusting humidity control and sensing device which adjustment is determined automatically through an outside temperature sensing element.

These and other objects and advantages of my invention will more fully appear from the following description made in connection with the accompanying drawings, wherein like reference characters refer to the same or similar parts throughout the several views, and in which:

FIG. 1 is a schematic illustration of an installation embodying the concepts of applicant's device in a home and illustrating the air flow thereto;

FIG. 2 is a front view of a control device illustrated with a closing housing portion removed;

FIG. 3 is a vertical section taken substantially along line 3—3 of FIG. 2;

FIG. 4 is a schematic illustration of the wiring and mechanical linkages of the preferred form of the invention;

FIG. 5 is a schematic illustration similar to that of FIG. 4 showing a modified form of the invention.

In accordance with the accompanying drawings, the device embodying the concepts of applicant's humidity control invention is illustrated in operative condition within a building as shown in FIG. 1. In this building B a circulatory fan F is illustrated which is provided to bring air from the exterior of the building into the building and likewise is provided to simultaneously draw air from within the building and expel the same from the building. The control device of the invention is generally designated 10 and is shown on an inside wall of the building B and is connected to an outside temperature sensing device generally designated 11. Control device 10 is electrically operated and therefore a circuit box C is illustrated. It should be explained initially that although the fan F is illustrated, it would be possible to substitute for this fan any device such as a compressor or the like which would provide a flow of air through the building.

In the preferred form of this invention the general idea is to initially set the control device 10 at a proper predetermined relative humidity. For example, a 40% relative humidity may be selected for comfort with a corresponding internal temperature of 70 degrees. As the temperature exteriorly of the building decreases, and the exterior surface of the building assumes this lower temperature, the control unit 10 through the outside temperature sensing element 11 is automatically adjusted to provide a substantially lower internal relative humidity. For example, at minus 20 degrees this internal relative humidity may be automatically adjusted to approximately 30%. The idea behind this adjustment is that the reduced water vapor at the 30% level will not condense on the exterior surface of the building whereas a higher relative humidity would condense at this lower temperature.

In the preferred form which is best illustrated in the vertical section of FIG. 3, the control device 10 includes a mounting or base plate 12 arranged for mounting the operative elements of the unit thereon. An expansion device 13 is mounted on plate 12 and in the form shown includes a substantially cylindrical body member having a diaphragm 14 mounted therein to provide an expansion chamber 15 between the diaphragm 14 and one end 13a of the senser 13.

The outside temperature sensing element 11 communicates with chamber 15 through a pressure conduit 16 such that when the sensing element 11 is exposed to a high temperature, the sensing fluid will expand and cause the chamber 15 to be enlarged, thus moving diaphragm 14. Conversely, a reduction in outside temperature will cause a contraction of chamber 15 thus drawing diaphragm 14 inwardly. Such temperature sensing devices are commonly known and readily available.

A plunger member 17 is provided in communication with diaphragm 14 to move in association therewith and a spring member 18 may be provided to insure positive movement of plunger 17. The plunger is in the form shown provided with an internal threaded passage 17a to receive an adjustment shaft member 19. One end 19a of shaft 19 is in the form shown threadably received into aperture 17a and an adjustment nob 19b is provided on the other end thereof. Intermediate the ends of shaft 19 a circumferential shoulder 20 is provided.

A humidity sensing portion of the control unit 10 in the form shown consists of a plurality of human hair lengths 21 which will expand upon the absorption of water vapor to increase their effective length and likewise will contract upon a reduction in humidity to decrease their effective length. In the form shown, one end 21a of hairs 21 is connected to one arm 21a of a bell crank 22 which crank is mounted for rotatable movement on a support plate 23. The other arm 22b of the bell crank 22 is provided with a shaft receiving aperture 22c which permits placement of arm 22b about control shaft 19 in adjacent controlled relation with respect to the shoulder 20 of said shaft 19.

Opposite end 21b of hair lengths 21 is attached to a spring loaded lever member 25 pivotally attached to support plate 26 which in turn is mounted on base plate 12. A spring 26a is provided at the attachment point of lever 25 to insure proper position thereof and likewise insure the proper relation of bell crank arm 22b to shoulder 20. A micro-switch member 27 is provided in switching relation to the arm 25 for control of the fan F or similar device. A housing 28 would normally be provided about the entire unit 10 to prevent an unskilled person from unduly tampering with the critical adjustment of the control unit 10.

Primary operation of this preferred form will be described without including the automatic calibration with the temperature sensing element 11. If this sensing portion is not available the operation is as follows. Proper calibration of the length increase and decrease of the humidity sensing hairs 21 permits adjustment of shaft 19 to place the shoulder 20 controlling the bell crank 22 at a point where an increase in relative humidity within the building will cause the hairs to expand lengthwise permitting spring loaded lever 26 to trip the micro-switch 27 and close the circuit to the fan F. Assume for example that a comfortable condition exists when the internal relative humidity is 40% at 70 degrees. A reduction in relative humidity will not produce any switching action but a relative humidity increase will cause the hairs 21 to expand lengthwise closing the circuit to the fan F permitting cool dry air to be drawn into the building and replace the moisture laden air. This additional moisture which causes the relative humidity rise is available in a well-sealed home through the normal living processes such as cooking, bathing, etc.

With this basic description the inclusion of the temperature sensing element 11 and diaphragm chamber device 15 now permits automatic adjustment of the relative humidity responsive to the outside temperature. The operation of this feature is substantially as follows. Assume again that the device has been set for 40% relative humidity at 70 degrees internal temperature with the added factor of an external temperature of 20 degrees. A decrease in temperature outside of the building will cause the diaphragm chamber 15 to contract and the shoulder 20 will be displaced towards the base plate 12 due to the action of spring 18. The spring loaded hair structure 21 including lever 25 will now be moved closer to the switching point of the micro-switch and if the internal relative humidity is 40%, the fan F will automatically be energized and will remain energized until the sensing hairs 21 have lost some of the absorbed vapor and have tightened to bring lever 25 out of switching position. If the temperature outside steadily decreases this same function continues in that the switching lever 25 is moved closer and closer to switching position such that the sensing hairs 21 have to expand in lesser amounts in order to trip the micro-switch 27 and energize the fan F. Conversely, should the temperature rise, the expansion chamber 15 will expand, the shoulder 20 will be displaced outwardly from the base plate 12 moving the switching lever 25 away from switching position.

This increase distance to switching position requires more water vapor in the air before the micro-switch 27 will be tripped and the fan F energized. This system then provides an automatic lockout for the unit 10 in that at times when internal heat is not necessary such as during the summer the expansion of chamber 15 will be so great that it would be impossible for the relative humidity to expand the hair sensing elements 21 to a point where the switch 27 could be tripped. This lockout prevents a situation wherein, should the outside temperature be high with a high outside relative humidity, the device would be actuated to bring in additional moisture laden air.

In a modified form of this invention, there is an additional feature added and this feature is particularly important where the home has a normally large air flow per hour which may be caused by window or door leaks etc. In this case the problem is not of too much water vapor within the home but rather the admission of too much cold dry air into the building such that the relative humidity within the building is too low. This low humidity situation would include a system for adding moisture to the internal air to raise the relative humidity. Many of such devices are currently on the market.

In this device as best illustrated in FIG. 6 a three position micro-switch element would be provided. A normally closed position to control the moisture adding device would be provided in addition to the normally open humidity removal device as previously described. In this case should the temperature be substantially low outside of the building and the relative humidity be substantially low within the home the dryness of the sensing hairs 21 would keep the switch in normally closed position until the proper relative humidity was reached. For example, control 10 could be adjusted through the control shaft 19 to turn off the moisture adding system at an internal relative humidity of 30% at an external temperature of minus 20 degrees; raising of the external temperature to, for example, plus 20 degrees would expand chamber 15, shifting lever 25 to maintain contact with the humidity adding device until the humidity adding device raises the relative humidity to 40%. At this point the switch mechanism would be shifted to be in neutral position and an increase of internal relative humidity could shift lever 25 due to the sensing hair 21 expansion to actuating fan F.

This modified device then is certainly useable with any type of heating system which would include a removal fan and a moisture additive device. However, in any installation all of the units are primarily controlled by the outside temperature sensing device.

No matter which of the two control devices is selected, the device substantially works in the same manner which is to say that an internal humidity control is calibrated to be automatically adjusted in response to an increase in outside temperature. The automatic adjustment feature eliminates the necessity of a constantly monitored manual setting device while still absolutely providing a comfortable range of relative humidity within the building.

Although various ranges of relative humidity etc. have been discussed, it is obvious that the control apparatus 10 may be adjusted for any particular range of desired internal relative humidities.

It should be obvious that applicant has provided a new and unique internal relative humidity control responsive to an external temperature to prevent condensation of water vapor at the temperature differential surface of the building.

Although the applicant has described the use of this humidity control device in connection with buildings and the like, it should be obvious that this useage may be extended to any interior heated space including both land and air passenger vehicles, boats, or any other closed space in which it is desirable to control the humidity.

It will, of course, be understood that various changes may be made in the form, details, arrangements and proportion of parts without departing from the scope of the invention, which generally stated consists in the matter set forth in the appended claims.

What I claim is:

1. A humidity control device for controlling the relative humidity internally of a building, the building having a positive air moving system, said device including:
   (a) a humdity sensing element arranged to be installed interiorly of the building;
   (b) switching means operatively positioned with respect to said sensing element for actuation thereby and arranged to control the air moving system of the building; and
   (c) an external temperature sensing, pressure generating element mechanically associated with said sensing means to adjust the position of said sensing element with respect to said switching means in response to the external temperature whereby the unit will be automatically adjusted to energize the air moving device at a lower relative humidity.

2. The structure set forth in claim 1 and adjustment means for initially positioning the humidity sensing element to actuate said switch mechanism at a first internal relative humidity.

3. A humidity control device for controlling the relative humidity internally of a building, the building having a positive air moving system said device including:
   (a) a humidity sensing element arranged to be installed interiorly of the building;
   (b) switching means cooperatively positioned with respect to said humidity sensing element for actuation thereby upon sensing a predetermined relative humidity;
   (c) adjustment means for presetting the relative humidity actuation point of said humidity sensing element to a first predetermined relative humidity point; and
   (d) external temperature sensing pressure generating means having at least a portion thereof arranged to sence the temperature exteriorly of the building and having a second portion mechanically associated with said adjustment means for automatically calibrating the relative humidity actuation point and reducing the actuation point upon a decrease in external temperature.

4. A humidity control device for controlling the relative humidity internally of a building, the building having a positive air moving system said device including:
   (a) a relative humidity sensing element arranged to be mounted interiorly of the building and including:
       (1) a plurality of humidity sensing hairs length expanding in length upon absorption of water vapor;
       (2) one end of said hairs being attached to an adjustable member;
       (3) the other end of said hairs being connected to a switch actuating lever member;
   (b) switch means controlling the air flow device positioned in actuating relation to said lever member;
   (c) means for moving said adjustable support whereby the actuating lever member on the other end of said hairs is positioned with respect to said means; and
   (d) temperature sensing pressure generating means having a portion thereof arranged to sense the temperature exteriorly of said building and cooperatively mechanically connected to said adjustment means to shift the actuating lever into more closely spaced actuating position with respect to said switch means when the external temperature is lowered whereby the amount of water absorption before actuation may be released.

5. A device for controlling the relative humidity within a building which building is provided with an air flow system and a water vapor adding system including:
   (a) a humidity sensing element arranged to be installed interiorly of the building;
   (b) switching means in actuating relation to said humidity sensing element for actuation thereby including at least two sets of control switches one set arranged to actuate the humidity adding device and one set to actuate the air flow device; and
   (c) an external temperature sensing element cooperatively associated with said sensing means to adjust the position of said sensing element with respect to said switching means in response to the external temperature whereby one of said systems will be energized in accordance with the relative humidity within the building.

6. A humidity control device for controlling the relative humidity of a building, the building having a positive air moving system, said device including:
   (a) a relative humidity sensing element arranged to be mounted interiorly of the building and including:
      (1) a plurality of humidity sensing hairs expanding in length upon absorption of water vapor;
      (2) one end of said hairs being attached to an adjustable member;
      (3) the other end of said hairs being connected to a switch actuating lever member;
   (b) switch means controlling the air throw device positioned in actuating relation to said lever member;
   (c) pressure responsive means for moving said adjustable member whereby the actuating lever member on the other end of said hairs is positioned with respect to said switch means; and
   (d) pressure generating means arranged to sense the temperature exteriorly of the building and arranged to transmit pressure to said pressure responsive means in response to the exterior temperature to shift said actuating lever member into more closely spaced actuating position with respect to said switch means when the external temperature is lowered.

7. The structure set forth in claim 6 and said pressure responsive means including an expandable diaphragm member cooperatively associated with said adjustable support member to shift the position thereof in response to expansion and contraction of said diaphragm.

8. The structure set forth in claim 7 and said pressure generating means including a fluid container having pressure communication with said pressure responsive means said container arranged exteriorly of the building and transmitting pressure in accordance with the raising and lowering of the external temperature.

9. The structure set forth in claim 6 wherein said pressure responsive means and said pressure generating means are arranged and constructed for shifting said adjustable said support member into a block out position and the length of hairs being determined to prevent switching of the air flow device in said block out position.

References Cited
UNITED STATES PATENTS

| | | | |
|---|---|---|---|
| 1,540,322 | 6/1925 | Folsom | 236—44 |
| 1,584,213 | 5/1926 | Carlstedt | 236—44 |
| 1,815,385 | 7/1931 | Wigelsworth | 236—44 X |
| 1,962,098 | 6/1934 | Zellhoefer | 236—44 |
| 2,008,323 | 7/1935 | Duffield | 236—44 |
| 2,102,354 | 12/1937 | Chambers. | |
| 2,240,390 | 4/1941 | Chappell | 236—44 |

WILLIAM J. WYE, *Primary Examiner.*

ALDEN D. STEWART, *Examiner.*